May 8, 1951 C. E. CHARLES 2,551,927
TIMER
Filed Aug. 22, 1946 3 Sheets-Sheet 1

INVENTOR
CLAYTON E. CHARLES.
BY George H. Fisher
ATTORNEY

May 8, 1951 C. E. CHARLES 2,551,927
TIMER
Filed Aug. 22, 1946 3 Sheets-Sheet 3

INVENTOR
CLAYTON E. CHARLES
BY George H. Fisher
ATTORNEY

Patented May 8, 1951

2,551,927

UNITED STATES PATENT OFFICE 2,551,927

TIMER

Clayton E. Charles, Minneapolis, Minn., assignor to Minneapolis-Honeywell Regulator Company, Minneapolis, Minn., a corporation of Delaware Application August 22, 1946, Serial No. 692,359

20 Claims. (Cl. 161—1)

My invention is related to timing devices for controlling the duration of an electrical circuit. More particularly it is related to means for closing a circuit for a definite period of time after which the circuit will remain open for another and longer period of time; however, provision is made for closing the circuit in response to a positive demand of an external switching device at any time and maintaining said circuit as long as the demand exists, after which the device will again resume automatic periodic control, and the period for which the circuit will remain open, will commence at the termination of the external demand without regard to the sequence of timing which existed prior to such demand.

While a device of this general nature may have utility in several fields, it is of particular importance in timing the periodic operation of a stoker of the type generally used in domestic heating systems. In such systems which are usually controlled by a remote space thermostat, it is necessary that the circuit controlling device be adaptable to initiate operation of the stoker at any time that the space requires additional heating but it is also advisable to periodically provide for the operation of the stoker so as to supply sufficient fuel to the furnace to maintain combustion even though the temperature of the controlled space remains within the desired limits.

In regulating such fire-maintaining operations of a stoker, which necessarily should be of an automatic nature, and at pre-determined intervals, it is important that such automatic operation should not take place immediately following a normal operation in response to the condition in the space whose temperature is being controlled. In fact, it is preferable that after such a normal operation, the next fire-maintaining operation should not take place in less than the normal waiting time provided for by the automatic control.

In the prior art there are numerous examples of devices intended to provide timed control for the operation of stokers and the like. Those which have been more successful from the commercial point of view have depended for their operation upon either a thermally actuated device or, a synchronous motor type of control. Both of these types of timers have in the past had certain inherent defects. The thermal motor type became inaccurate because of the continuous heating and cooling of the actuating mechanism, and the synchronous motor type became inaccurate because of wear of the moving parts.

The device which forms the present invention is partly dependent upon the pressure of a liquid stream, and upon the time required for a liquid which is not readily affected by temperature change to pass from one level to another. I am aware that there are some examples of timing devices for the operation of such mechanisms as stokers, whose operation is dependent upon the flow of liquid from one level to another. My device is an improvement over these prior art devices.

The advantages of the present device are that primarily it is extremely accurate in timing sequence; it is positive in its operation; and the device is capable of having an indefinite period of usefulness since the minimum number of moving parts which exist are immersed in, or subjected to the flow of a liquid having lubricating properties.

The present device provides a hydraulic pressure system for instantly initiating a control circuit regardless of whether the demand is by an external means such as a space thermostat or other switch, or by an internal function which represents the passage of a preselected period of time from the last operation, and thereafter through controlled liquid flow, which control may be quickly varied over a wide range. The duration or reinitiation of the circuit may be effected automatically. The automatic control, however, is always subservient to the external control, and the next automatic operation will not take place until the normal lapse of time from the previous operation.

One object of the invention is to provide an accurate circuit controlling timer which is operable to establish a circuit in response to an external demand at any time, and which will thereafter provide a reclosing of said circuit only after a predetermined time following the previous operation of said device.

Another object is to provide a hydraulic timer operable with fluid pressure, to quickly and positively move a circuit controlling switch into an operative position and to control the duration of said position by the elapse of time required for a fluid to flow through a restriction.

Another object is to provide a means of controlling the automatically timed waiting period between operations of a hydraulically operated timer by the elapse of time required for a liquid to be siphoned from one chamber to another.

A further object is to provide manually adjustable means for definitely establishing the duration of the circuit and the waiting period between times when the circuit is established, and for varying such periods of time over a wide range.

Other and further objects and advantages will become apparent from the following description and claims and from the appended drawings in which:

Figure 4 is a side view of the device as seen from the left of Figure 1 with certain parts in cross section and others broken away;

Figure 5 is a detail view of a liquid pump and the mechanical linkages to parts controlled by the pressure produced by the pump, with the motor removed;

Figure 9 is a plan view of the lower liquid chamber, showing means for conveying liquid from the chamber to a laterally enclosed well from whence it is conducted back to the casing; and, Figure 10 is a detailed view taken on the lines 10—10 of Figure 1.

Figures 1, 2, 3:
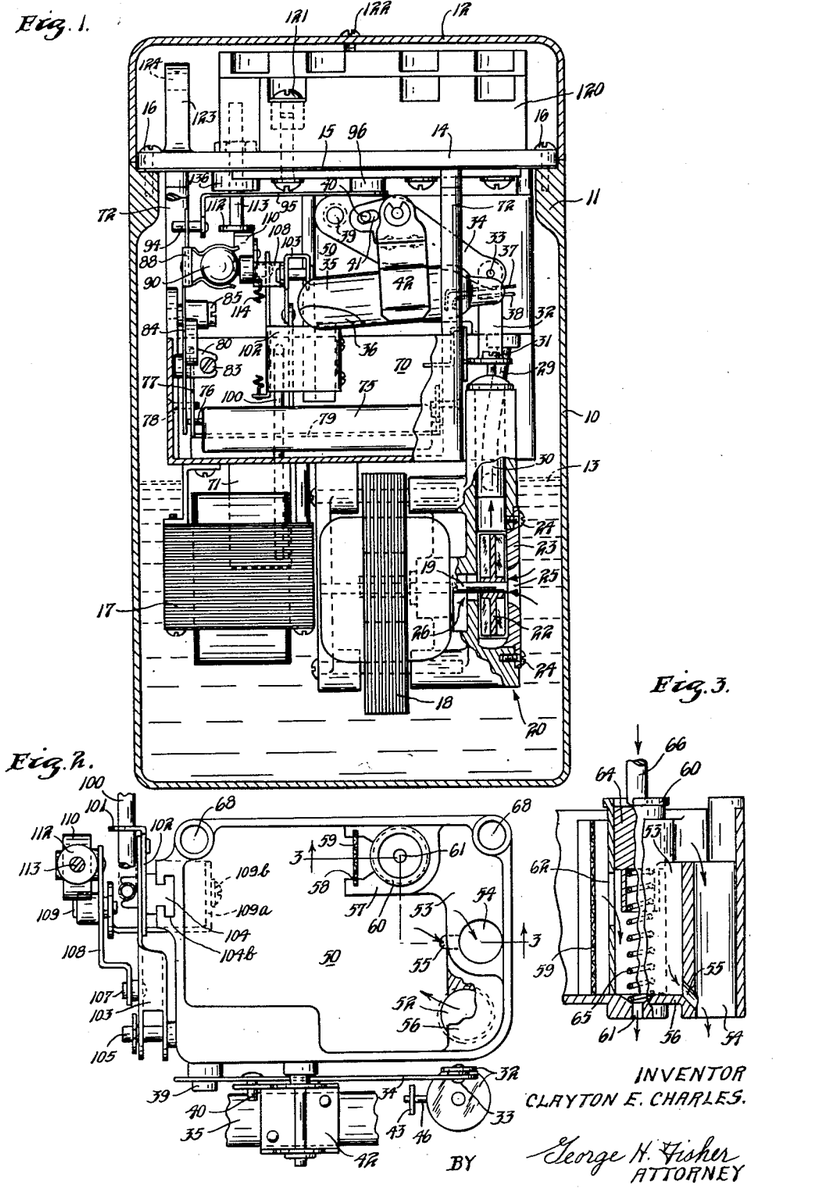
Figure 1 is a rear view of the mechanism with the casing shown in cross section and certain parts broken away.
Figure 2 is a plan view of the upper, or first liquid receiving chamber.
Figure 3 is a section taken on the lines 3—3 of Figure 2.

Referring now to the drawings, and particularly to Figure 1, the reference character 10 indicates a substantially rectangular hollow casing which has a shoulder portion 11 extending about the periphery of the upper edge of the casing. A cover portion 12 engages the portion 11 and encloses the top of the casing. Within casing 10 is a liquid 13 which consists of a redistilled petroleum product having a low viscosity and a high viscosity index, i. e., one whose viscosity remains constant over a relatively large change in temperature of the liquid. A plate 14 is provided for supporting a mechanism within the casing in a suspended manner with a gasket 15 provided between the plate 14 and the portion 11 to provide a fluid tight seal after screws 16 have been firmly engaged with the plate. The liquid 13 which has lubricating properties is sealed within the casing 10 and since it flows in and about the various parts will provide adequate lubrication therefor and need not normally be replaced or changed.

Figures 4, 5, 9, 10:
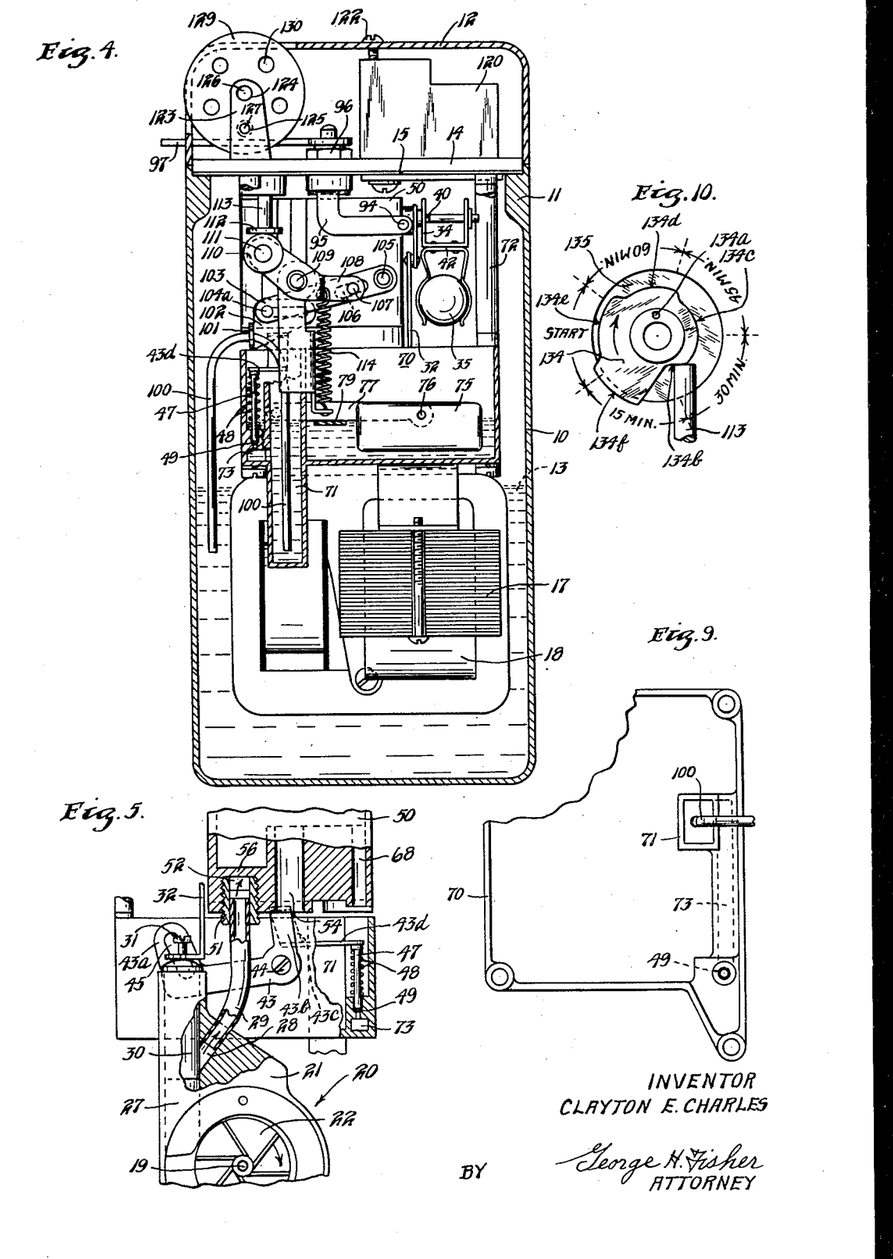

A conventional transformer 17 provides low voltage current for the operation of motor 18, which through shaft 19, provides moving power for a pump indicated by the general reference numeral 20. The pump 20, seen in profile in Figure 1 and in partial detail in Figure 5, is a centrifugal pump having a body portion 21, a rotor 22, and a cover portion 23 which encloses the rotor and which is held in place by screws 24. The pump has a first inlet 25 through the cover 23 and a second inlet 26 shown in Figure 1 as an aperture which extends inwardly about the shaft 19. An outlet 27 is provided for the pump which has a branch passage 28 extending through an angular portion of the body 21 to communicate with a conduit 29 that provides for the passage of liquid. A piston 30 is provided in the outlet 27 and is so positioned that in an inactive position it cuts off the passage 28 in such a manner that when the pump is started, it is necessary for the hydraulic pressure of the fluid to displace piston 30 in an upward direction before the liquid may enter the passage 28 and the conduit 29. Attached to the upper portion of piston 30 by screw 31, is an angularly shaped link 32 which is connected by a pivot 33 to one end of a lever member 34. The lever 34 is provided to give tilting motion to a mercury switch 35 which is of the usual sealed envelope type having therein a liquid mercury globule 36, and lead wires 37 and 38 which extend from one end of the envelope. Lever 34 is adapted for movement on a pivot 39. In close proximity to pivot 39 is another pivot 40 and slidably mounted on pivot 40 by means of an aperture 41 is an extension of a clamp 42 which serves as holding means for the envelope of mercury switch 35. The purpose of the mercury switch is to establish a circuit through the leads 37 and 38 to an external device, such as a stoker motor, upon the occasion of the mercury switch being moved to an operative position by movement of the linkage just described.

As best seen in Figures 5 and 2, the conduit 29 connects through an adapter 51 and an aperture 52 into an upper liquid chamber which is designated by the general reference numeral 50. The chamber 50 is adapted to receive all of the liquid which is delivered by pump 20 through conduit 29 which is of sufficient volume to fill it substantially immediately and the chamber is further adapted to maintain a substantially constant level of said liquid. To accomplish this result, an inner wall structure 53 is provided within chamber 50 and extending downwardly within this wall structure 53 is an overflow outlet 54, which is of ample dimension to carry off all of the liquid which will exceed the height of wall 53. Another aperture 55 is provided at the base of wall member 53 for the purpose of completely emptying chamber 50 after a pumping operation has been completed. To prevent liquid which enters the inlet 52 under pressure, from spurting out of the top of chamber 50, a horizontal wall structure 56 is made to extend over the aperture 52 to serve as a baffle. Adjacent the wall portion 53 is another wall portion 57 being somewhat higher than portion 53. A bifurcated portion of the wall portion 57 is provided with slots 58 into which is inserted a screen 59. A tubular member 60 (seen in Figure 3) having a lower aperture 61, and a longitudinal slot 62, is positioned within wall portion 57 for metering liquid out of the constant level chamber 50. A plunger type valve 64 is slidably mounted within the interior of tubular member 60 and is opposed in its downward movement by a resilient spring 65. A rod 66 is attached to the upper portion of valve 64 for moving the valve against the resilient spring 65 by means to be described hereinafter, so that the valve may restrict a portion of the area of slot 62 to thereby restrict flow of liquid through slot 62, tube 60 and aperture 61.

Figures 6, 7, 8:
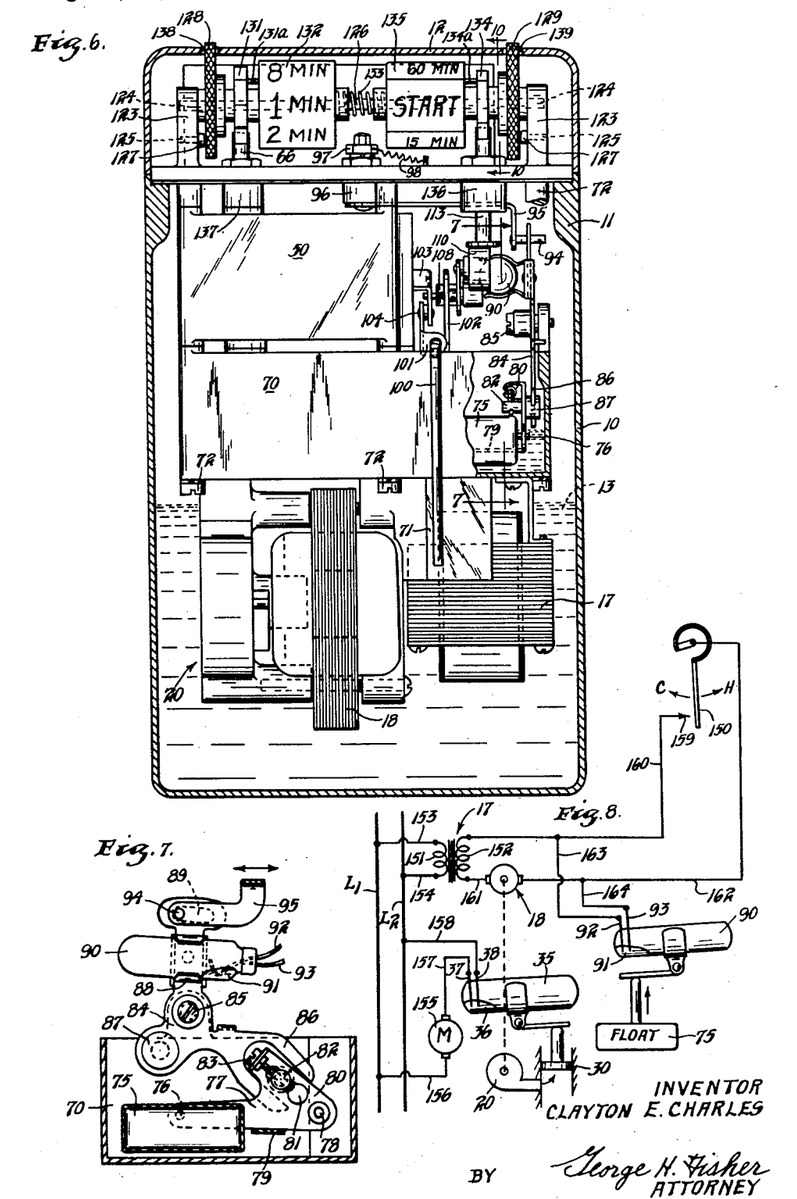
Figure 6 is a front view of the mechanism with a part of the second chamber broken away to show internal parts.
Figure 7 is a detail of the linkage between a liquid float and one of the tiltable switches taken on lines 7—7 of Figure 6 looking in the direction of the arrows.
Figure 8 is a schematic illustration of a circuit arrangement for the operation of the device and of a motor controlled by the device.

Positioned beneath chamber 50 is a second chamber 70 which is provided to receive that portion of the liquid which passes through slot 62 and aperture 61 of tubular member 60. Chamber 70 (Figure 9) is provided with a laterally enclosed well 71 which is spaced from the walls of the chamber. Well 71 is open at the top and is provided with a side inlet through a conduit 73. The well extends downwardly from a point level with the top of chamber 70 to a point which is substantially below the base of the chamber as best seen in Figure 4. To more easily understand the function of well 71 and conduit 73 as disclosed in Figure 4, parts of the well and the conduit have been broken away to show communication between chamber 70 and the well, the same being shown in full lines in Figure 9. A plurality of posts 72 extend through the reinforced sidewall portions of chamber 70 and two of these posts extend through the apertures 68 in chamber 50 to provide support for chamber 70 beneath chamber 50 on plate 14. Within chamber 70, in addition to the well 71, a float member 75 is provided which is responsive to the liquid level in the chamber, and is adapted for actuating a second control member in a manner to be described hereinafter. As seen in Figure 7, the float member 75 is fastened at each side by a pivot 76 to a yoke 77. The opposite ends of the yoke 77 are pivotally mounted as at 78 to the interior of chamber 70 and a cross member 79 is provided between the bifurcated portions of the yoke. An angular portion 80 of one of the arms of yoke 77 is provided with an aperture 81 into which a bearing member 82 is adjustably mounted and held in a fixed position by set screw 83 which extends longitudinally through the angular portion 80. A bell crank lever 84 which is pivotally mounted on a pin 85, has a bifurcated portion 86 at one end and a counter weight 87 adjacent its pivot. The bifurcated end portion 86 loosely fits about bearing member 82 to provide lost motion between the bearing member 82 and the opposite arms of the bifurcated end portion 86. A clamp 88 is firmly mounted on an upper portion of one of the arms of bell crank lever 84 above the pivot 85 and provides means for securing the envelope of a mercury switch 90 which contains a mercury globule 91 and leads 92 and 93. An extension of bell crank lever 84 above the clamp 88 is provided with an elongated aperture 89 to receive a pin 94 which extends from a lever 95.

As may be best seen in Figures 6 and 4, lever 95 is connected to one end of a rotatable connection situated in a member 96 which is in turn supported on plate 14. A manually operable lever 97 which protrudes through a slot in cover portion 12 is connected to the other end of the rotatable connection, which is situated in member 96, to provide a means of manually rotating the mercury switch 90 to an open or closed circuit position. A tension spring 98 having one end anchored in plate 14 and the other end connected to lever 97 provides a return movement to lever 97 when the lever is laterally moved in one direction from a central or mid-position. In its normal or mid-position, lever 97 has no effect upon the operation of mercury switch 90 since pin 94 on lever 95 under these conditions is situated at a central point in the elongated aperture 89 of the upper arm of bell crank lever 84.

The normal operation of moving mercury switch 90 between opened and closed circuit position is controlled by float 75 and the cooperating linkage between it and clamp 88, in response to liquid level in chamber 70. The manually operable means will positively move the switch to either position, but, as will be explained later, even though switch 90 be manually moved to an open circuit position, the device is still subservient to a demand from an exterior switch such as a room thermostat.

In the steps of conducting liquid from chamber 50 in sufficient quantity to fill chamber 70 within a regulated period of time, and also in the steps of conveying liquid from chamber 70 to casing 10 in a regulated period of time, it is essential to prevent the flow of a portion of the liquid out of chamber 70 during the period when additional liquid is entering the chamber. To accomplish this, means are shown in Figures 2, 3, 4 and 9. A bell crank lever 43 is pivotally mounted on the side of chamber 70 by fastening means 44. At one end, the bell crank is provided with an up-turned portion 43a within which is an elongated aperture 45 that slidably fits over a pin 46 (see Figure 2) extending from the lower angular portion of link 32. On the other side of pivot 44 the bell crank 43 is formed in an inverted U-shape with one of the legs 43b situated on the outside of chamber 70 and the other leg 43c extending within the interior of chamber 70 (see Figure 5). The inner leg 43c is angularly bent to form a horizontal extension 43d which connects to a valve stem 47. The valve stem 47 has surrounding it a return spring 48. The valve stem 47 moves in a vertical manner with respect to a valve seat 49 that is situated in the horizontal conduit 73 located on an inner side wall of chamber 70 in lateral communication with well 71. Thus the normal liquid exit from chamber 70 is past valve seat 49, through conduit 73 and well 71, since the well is closed on its lateral sides and is provided with a top opening which is above the normal liquid level in chamber 70.

Referring next to Figures 2, 4, 6 and 9, a syphon 100 is shown mounted in relation to chamber 70 with one of its legs extending through the top opening of the well 71 to a point below the base of chamber 70, and its other leg extending over the side of chamber 70 and directed into casing 10. Syphon 100 is adapted for vertical movement with relation to chamber 70 and well 71 by a mechanical linkage which is manually operable by means situated above plate 14. The mechanical linkage consists of a loop 101 which encircles the top U-shaped portion of syphon 100. Loop 101 is fastened to a bracket 102 which is pivotally connected to one end of a lever 103 by a pin 104a on a block 104. The block 104 (Figure 2) is vertically slidable in a track 104b that is formed integral with a side wall of casing 50. At its other end lever 103 is angularly turned and rotatably mounted on a fixed pivot 105 that is fastened to casing 50. A bell crank lever 108 is provided with a pivot 107 which is slidably movable in an elongated aperture 106 in lever 103. The bell crank lever 108 is rotatable about a pivot 109 that extends from a U-shaped stationary bracket 109a. The bracket 109a is attached at 109b to track 104b. At its other end bell crank lever 108 carries a frictionless roller 110 by a pivot 111. Supported by plate 14 is a rod 113 whose vertical movement is controlled by manually operable means to be explained later. At the base of rod 113 is a disk 112 which abuts roller 110. A tension spring 114 is connected at one end to stationary bracket 109a and at its other end to one arm of bell crank lever 108, to keep the other arm of the bell crank lever which supports roller 110 in constant engagement with disk 112 of rod 113.

Located on the upper side of plate 14 are a plurality of manually operable control elements and fastening means for electrically connecting the device with a source of power and other electrical devices. As seen in Figure 1, a terminal block 120, made of insulating material, is provided with a plurality of terminal receiving members 121 which are located on the rear of plate 14, and accessible when the cover member 12 is removed. A screw 122 is provided for attaching the cover 12 to terminal block 120.

As previously set forth, the timer is adapted to be manually adjusted to a plurality of different timing conditions. On the front portion of plate 14, as shown in Figures 4 and 6, are a pair of bosses 123 provided with apertures 124 and 125. A shaft 126 extends between the two bosses 123 and is positioned within the apertures 124 to provide a bearing surface for a plurality of rotatable elements. A pair of detent pins 127 having enlarged rounded head portions are located in the small apertures 125 with the head portions extending inwardly from bosses 123. A pair of manually rotatable wheels 128 and 129 having knurled surfaces on their outer peripheries are rotatably mounted on shaft 126 and are each provided with a series of apertures 130 in the sides thereof for engagement with detent pins 127 to prevent free rotation of the wheels on shaft 126. A step cam 131 having eight eccentric surfaces each of different radius than the remainder, is formed integral with wheel 128. Adjacent step cam 131 and fastened thereto by a small connecting pin 131a is a cylindrical dial 132 having on its outer surface eight legends representing time periods of one to eight minutes. Dial 132 is mounted with relation to step cam 131 so that the legend "1 min." coincides with the eccentric surface having the shortest radius. In a similar manner wheel 129 has formed integral therewith a step cam 134 which is connected by a small pin 134a to a cylindrical dial 135 which has five legends thereon, the first of which is marked "Start" and the remaining four being fifteen, thirty, forty-five and sixty minutes. As best seen in Fig. 10, cam 134 is provided with five eccentric surfaces, each being of a different radius than the remainder. These several surfaces cooperate with rod 113 to position syphon 100 at a different distance with respect to the liquid level in well 71. Surface 134b has the shortest radius which corresponds to the legend "Start" on dial 135 and which allows syphon 100 to be held in its lowest position. The remaining surfaces 134c, 134d, 134e, and 134f are each of successively greater radius and correspond to the legends fifteen, thirty, forty-five and sixty minutes on dial 135. A compression spring 133 is positioned on shaft 126 between dials 132 and 135 to bias each of the respective assemblies rotatably controlled by wheels 128 and 129 apart, so that detent pins 127 may engage into apertures 130 in each of the wheels to prevent free rotation of the wheels and therefore to hold the manual control members in the position to which they have been moved. Either wheel 128 or 129 may be rotated by a slight lateral pressure against spring 133 sufficient to disengage either one of detent pins 127 from one of the apertures 130.

The control elements described above are used to control the rate of flow of liquid entering chamber 70 and leaving well 71. Step cam 131 abuts rod 66 which is vertically movable through a packing gland 137 to control the position of valve 64 in tube 60, to thus control the rate of flow of liquid from chamber 50 to chamber 70. Step cam 134 abuts rod 113 which is vertically movable through packing gland 136 to control the position of syphon 100 with relation to the liquid level in chamber 70 and well 71 to adjust the rate of flow of liquid returning to casing 10. Wheels 128 and 129 partially protrude through apertures 138 and 139 in the cover portion 12, and two windows in cover portion 12 (not shown) provide visual observation of the legends on dials 132 and 135.

Referring now to Figure 8, there is shown an illustrative diagram of a system in which the device may be utilized. A conventional thermostat 150 is shown which would be normally positioned in the room or space whose temperature is to be controlled. The transformer 17 is shown with a primary coil 151 and a secondary coil 152. The primary coil 151 is joined to power line $L_1$ and $L_2$ by the connectors 153 and 154. A motor 155, such as a stoker motor, is shown connected to line $L_1$ by conductor 156 and to the lead 37 of mercury switch 35 by conductor 157. A conductor 158 joins lead wire 38 of mercury switch 35 to the power line $L_1$. A contact 159 carried by conductor 160 is adapted to engage the single blade of the room thermostat 150 to complete a circuit through conductor 162 to the secondary of transformer 17, which circuit includes the low voltage motor 18. Conductors 163 and 164 connect with the leads 92 and 93 of mercury switch 90 to form an alternate circuit for energizing motor 18 when thermostat 150 is in the open position shown.

The operation of the device as a means of controlling the circuit to a stoker motor will now be explained in detail. With the parts in the position shown in the several views of the drawings, the thermostat 150 is in a satisfied or open position and an automatically controlled fire maintaining operation has just started. Float 75 is in its lowest position with mercury switch 90 moved to a closed circuit position to complete a circuit to motor 18 which may be traced as follows: from the secondary coil 152 of step down transformer 17, through conductor 160, conductor 163, lead 92, mercury globule 91, lead 93, conductor 164, conductor 162, motor 18, and conductor 161 back to secondary 152. Starting of motor 18 initiates operation of pump 20 which draws oil 13 into the pump 20 through inlets 25 and 26 and is forced upwardly through outlet 27 by the impeller 22. The pressure of oil in outlet 27 moves piston 30 upwardly to concurrently rotate bell crank lever 43 moving valve stem 47 into engagement with valve seat 49 and at the same time rotating lever 34 to move mercury switch 35 to a closed circuit position. Movement of mercury switch 35 to a closed circuit position initiates a circuit to stoker motor 155, which may be traced as follows: from line voltage conductor $L_1$, through conductor 156, motor 155, conductor 157, lead 37, mercury globule 36, lead 38, and conductor 158 back to line voltage conductor $L_2$, whereupon stoker motor 155 begins delivering fuel to the furnace. As soon as piston 30 moves away from the opening 28, the oil being moved by pump 20 passes through conduit 29 and adapter 51 into chamber 50. The rate at which oil is delivered by pump 20 to chamber 50 is such that despite the openings 55 and 62, the chamber is quickly filled to a point where a large surplus of oil overflows wall structure 53 and returns to casing 10 through the opening 54. Thus it should be understood that the capacity of pump 20 is such as to fill chamber 50 and maintain a substantially constant level of liquid therein within a few seconds after motor 18 has been energized. Under these conditions oil is now flowing through slot 62 and out of aperture 61 into chamber 70 in a quantity dependent upon the position of valve 64 so as to fill chamber 70 within the time specified by the setting of dial 132. When chamber 70 has been filled to a predetermined level, float 75, through the lost motion connection provided between bearing 82 and the end projections 86 of the bell crank lever 84 will move mercury switch 90 to an inoperative position thus breaking the circuit to motor 18. When motor 18 and pump 20 cease to operate, piston 30 in the absence of liquid pressure will drop to its lowest position causing mercury switch 35 to move to an inoperative position and rotating bell crank lever 43 so as to cause valve stem 47 to move away from its seat 49. Opening of the circuit through mercury switch 35 terminates operation of stoker motor 155 and the movement of valve stem 47 away from its seat 49 causes oil to flow from chamber 70 through valve seat 49 and conduit 73 into well 71 until the liquid level in the well is substantially the same as that in chamber 70. The stand-by period commences at the time that motor 18 ceases to operate and is regulated by the time required for syphon 100 to reduce the liquid level in chamber 70 and well 71 to a point at which oil will no longer flow from chamber 70 through valve seat 49, at which time float 75 will have moved to its lower position where it will, through the lost motion connection provided by bearing 82 and the end projections 86 of bell crank lever 84, again move mercury switch 90 to an operative position to recommence the operation just described. When the pumping operation has ceased as above described, chamber 50 will be substantially filled with oil which will drain out through slot 62 and the lower opening 55. The time required for the draining operation is very short and the additional drainage through slot 62 after completion of the pumping operation is about substantially equal to the time lost in filling chamber 50 to a point where oil will commence to pass through slot 62, thus compensating for the time lost in the initial phase of operation, and the residual quantity of oil will thereafter quickly drain through opening 55 to completely empty chamber 50.

It should be understood that the device will become operative in response to a demand for heat by the thermostat regardless of the position of any of the parts of the device and particularly whether the mercury switch 90 is, or, is not, in an operative position, since a circuit can be completed to motor 18 independently of mercury switch 90 as follows: from the secondary 152 of transformer 17 through conductor 160, contact 159, thermostat 150, conductor 162, motor 18 and conductor 161 back to secondary 152. Energization of motor 18 will move mercury switch 35 to initiate operation of stoker motor 155 in the manner previously described. Thus even though a periodic operation of the device may have been just completed, the thermostat may call for operation at any time and will cause continuous operation of the device until the thermostat is satisfied, after which the normal standby period will commence and extend until the next automatic operation. Should the thermostat demand heat for a period of time such that chamber 70 would be filled to a point of overflowing, this will cause no material damage inasmuch as the oil merely returns to casing 10 and although under these conditions chamber 70 may be filled to a slightly greater extent than under automatic operation, the standby period will be at least as long as that required after an automatic operation.

The adjustment of the period of time in which the stoker motor will operate under automatic control is controlled by rotation of the knurled wheel 128, which through the cooperation of step cam 131 is capable of positioning valve 64 in any one of eight positions with relation to slot 62. The adjustment of valve 64 with relation to slot 62 determines the period of time in which chamber 70 will be filled to its upper predetermined limit. Likewise the adjustment of the period of time in which the device controls the stand-by period is controlled by rotation of knurled wheel 129, which through the cooperation of step cam 134, rod 113, and the linkage which cooperates with loop 101, controls the position of syphon 100 with relation to the liquid level in well 71 and chamber 70. This adjustment is available in four steps from 15 to 60 minutes with an additional step provided for priming the syphon. When the device is initially placed in use or, after it has been inactive for a long period of time, there is likelihood that the syphon may have lost its prime. To prime syphon 100, wheel 129 and step cam 134 are rotated in the direction indicated by the arrow in Fig. 10, until the legend "Start" appears on dial 135. By reason of the graduated steps or eccentric surfaces on cam 134, rod 113 is successively depressed upon coming into contact with each surface of the cam until the cam is rotated beyond surface 134f where there is a sharp drop off to surface 134b. As rod 113 is depressed, syphon 100 is lifted, thus by rotating wheel 129 the syphon is progressively moved to its highest position but as surface 134f is replaced by surface 134b, spring 114 rapidly moves syphon 100 to its lowest position, which when well 71 is substantially filled with liquid, will cause the syphon to be purged of air and filled with liquid. While the foregoing is described as a preferred manner of priming syphon 100, I have also found that the syphon may be primed by capillary attraction. This involves relating the dimension of the internal diameter of the syphon to the surface tension of the liquid so that when the syphon is moved to its lowest position, the surface tension of the liquid is capable of causing it to flow upward in the immersed leg by capillary attraction for a sufficient distance to pass over the U-shaped portion of the syphon. After the syphon has been primed, which is an assured operation in this device, and is momentarily effective, wheel 129 is again moved until dial 135 now shows the desired length of time for the intended stand-by period. Thus, the time period shown on dial 135 represents the calibrated periods of time required for syphon 100 to reduce the liquid level in chamber 70 to a point where float 75 will cause mercury switch 90 to be moved to an operative position.

As the liquid level changes in chamber 70, float 75 will move in unison with the liquid level, but to prevent its movement from immediately affecting the condition of switch 90, the lost motion connection between the bifurcated portions 86 of bell crank lever 84 and the bearing 82 becomes effective. In the filling operation, as the float 75 approaches its upper position, bearing 82 is in engagement with the lower surface of the upper arm of bifurcated portion 86 in such a manner that the buoyancy of the float causes the switch 90 to be moved to an inactive position, but as the float descends in the emptying operation, bearing 82 moves through the space between the arms 86 until it finally bears on the lower arm, whereupon the weight of the float is capable of moving switch 90 to an active position. Thus the switch is tilted only during the final increments of movement of the float in each direction.

Under certain conditions it may be desirable to have manual control of the device which will take priority over the automatically controlled features, such for example as when a fire is started, or to terminate operation of the device during the period of summer shut-down. To accomplish this to a limited extent, manually controlled lever 97 is provided. By laterally moving lever 97 to the left as shown in Figure 6, the pivotal connection in member 96 and lever 95 causes pin 94 to move in the aperture 89 of bell crank lever 84 to positively move mercury switch 90 to the right as shown in Figure 7 to a closed circuit position. Pump motor 18 is thus energized to cause closure of switch 35 and consequent operation of stoker motor 155. This movement is against the resilient tension of spring 98 which is provided to prevent the device from being left in a closed circuit position and causes lever 97 to return to a mid-position where automatic control is again resumed as soon as lever 97 is released. Likewise, by moving lever 97 to the right as shown in Figure 6, switch 90 is positively moved to an open position to terminate automatic operation, but in this case spring 98 does not produce a return effect as the purpose of the spring is to prevent the operator from leaving the device in a condition which would have a dangerous effect. However, movement of the mercury switch 90 to an open circuit position does not prevent operation of the device in response to a demand by the thermostat, and therefore to prevent operation by the thermostat it is necessary to render the thermostat inoperative, which may be accomplished for example by locking the thermostat in an open circuit position or by other conventional means of deenergizing the circuit from the source of power.

The particular advantages of the device described hereinbefore is that it is operable at any time in response to an exterior switch such as a room thermostat, but in the absence of such demand it will provide periodic operation of a switching mechanism for periods of time adjustable between one and eight minutes, although these periods of time could be extended or reduced as desired, and it also provides a series of automatically controlled stand-by periods between automatic operations or operations in response to the external switching mechanism. However in all cases the stand-by period commences at the termination of the preceding operation. The automatically timed circuit controlling mechanism becomes effective with the commencement of a simple operation of pumping liquid from one level to another and terminates with the ceasing of the pumping operation. The stand-by period between automatic operations is controlled by the time required for a predetermined quantity of liquid to flow from one level to another. Adjustment is provided for the time in which the automatically controlled switching mechanism is placed in an operative position and also the time between operations of the switching mechanism is likewise adjustably controllable. The two periods of time which the device is automatically operable to control are solely dependent upon the time required for a liquid whose qualities have been carefully selected, to pass through a controlled orifice or a conduit of known dimension, and since the liquid used with the device is of such a nature as to maintain a relatively constant viscosity over a relatively wide range of temperature, the device is capable of furnishing a highly accurate standard of timing without regard to the ambient temperature in which the device is located. Furthermore, the bearings (not shown) of motor 18 are the only portions of the device which are subject to movement or wear and are immersed below the level of liquid 13, so the device is capable of being operated for extremely long periods of time without depreciation or wear.

It will be obvious that some changes may be made in the apparatus herein disclosed without departing from the spirit of my invention as covered by the appended claims.

I claim:

1. A timer, comprising, a chamber for receiving a liquid, control means for initiating the flow of liquid to said chamber, a pressure responsive control device actuated to a first position quickly by the pressure of the liquid upon actuation of said control means, and timing means associated with said chamber and actuated by the liquid to terminate the flow of liquid when said chamber is filled to a predetermined extent.

2. In a timer, means for circulating liquid, a pressure responsive control device actuated quickly to a first position by the pressure of the liquid upon operation of said means, timing means actuated by the liquid, and means controlled by said timing means to cause quick actuation of said control device to a second position.

3. In a timer, a source of liquid supply, a pump for circulating said liquid, a pressure responsive control device actuated quickly to a first position by the pressure of the liquid when the pump is operative, timing means actuated by the liquid moved by the pump, and means controlled by said timing means to discontinue operation of said pump to cause quick movement of said control device to a second position.

4. A timer, comprising, a source of liquid supply, a first chamber, means for moving liquid from said source into said first chamber, first circuit controlling means responsive to movement of liquid into said chamber, a second chamber for receiving a predetermined quantity of liquid from said first chamber in a first specified period of time, second circuit controlling means responsive to the quantity of liquid in said second chamber for controlling the movement of liquid from said source to said first chamber, and means for reducing the quantity of liquid in said second chamber in a second specified period of time.

5. A timer, comprising, a casing, a liquid in said casing, a chamber in said casing for receiving a portion of said liquid, motor means for pumping said liquid from said casing to said chamber, a control device quickly actuated to a first position by the pressure of the liquid when the pump is operative, timing means associated with said chamber and actuated by the liquid moved by said pump to control the operation of said motor means, and an inverted U-shaped member for conveying liquid from said chamber.

6. A timer comprising, a casing containing a source of liquid, a chamber in said casing for receiving a portion of said liquid, a pressure operated switch, means for transferring liquid from said casing to said chamber through said switch to substantially fill said chamber within a predetermined period of time, a float situated within said chamber which is moved in response to a change of liquid level therein, a float actuated control device which is moved to a first position when said chamber is substantially empty and to a second position when said chamber is substantially filled, and a lost motion connection between said float and said control device which is operable to transmit movement to the latter only during the final increments of movement of said float in either direction.

7. A timer, comprising, a source of liquid, a first chamber, means for moving liquid under pressure from said source into said chamber, a first two-position circuit controlling means, means responsive to said liquid pressure for moving said circuit controlling means to one of its positions, a second chamber for receiving a predetermined quantity of liquid from said first chamber, adjustable means associated with said first chamber to limit the flow of liquid into said second chamber within a specified period of time, a second two-position circuit controlling means, means responsive to the liquid level in said second chamber for moving said second circuit controlling means between its two positions, and adjustable means associated with said second chamber for conducting liquid from said chamber within a specified period of time.

8. A timer, comprising, a liquid, a first liquid chamber, motor means for conducting liquid under pressure into said chamber, first control means movable to an operative position by said liquid pressure, a second chamber for receiving a predetermined quantity of liquid from said first chamber, an adjustable orifice in said first chamber for conducting liquid into said second chamber, a float in said second chamber, a second control means movably controlled by said float to terminate the operation of said motor means when said second chamber has been filled to a predetermined extent, and a variably positionable siphon for conducting liquid out of said second chamber to thereby cause said float to operate said second control means to initiate operation of said motor means when the liquid level has been reduced to a predetermined extent.

9. A timer, comprising, a liquid, a first chamber for maintaining a substantially constant level of liquid therein, means for conveying said liquid into said chamber, a first control member operably controlled by movement of liquid into said chamber, a second chamber for receiving a predetermined quantity of liquid from said first chamber, outlet control means associated with said first chamber for conveying said predetermined quantity of liquid to said second chamber within a specified time, a second control member operably controlled in response to liquid level in said second chamber, said second control member being operable to control the said means for conveying liquid into said first chamber, and means for emptying said second chamber in a selected period of time.

10. A timer, comprising, a casing, a liquid in said casing and a chamber in said casing for receiving a portion of said liquid, power means for moving liquid to said chamber a pressure operated switch actuated by the flow of liquid to said chamber, a control device actuated by the filling and emptying of said chamber for controlling the energization of said power means, said switch operating to energize an external load when liquid is flowing to said chamber, means for controlling the transfer of liquid from said casing into said chamber to establish a first predetermined period of time, and means for conducting liquid from said chamber back into said casing to establish a second predetermined period of time.

11. A timer, comprising, a casing, a liquid in said casing, a chamber in said casing and positioned above said liquid for receiving a portion of said liquid, a control device actuated by the filling or emptying of said chamber, means for controlling the transfer of liquid from said casing into said chamber to establish a first predetermined period of time, manually adjustable means for varying the time required for the passage of said liquid from said casing to said chamber, a syphon mounted in relation to said chamber for conducting liquid therefrom back into said casing to establish a second predetermined period of time, and manually adjustable cam means for varying the position of said syphon with relation to the liquid level in said chamber to thereby vary the said second predetermined period of time.

12. A timer, comprising, a casing, a liquid in said casing, a chamber in said casing for receiving a portion of said liquid, a control device actuated by the filling or emptying of said chamber, means for controlling the transfer of liquid from said casing to said chamber to establish a first predetermined period of time, liquid flow control means associated with said chamber for conducting liquid from said chamber back into said casing to establish a second predetermined period of time, and means for preventing return of liquid from said chamber to said casing during the period when said liquid is entering said chamber, said last mentioned means being operated by said first mentioned means.

13. In a timer, a source of liquid supply, a pump for circulating said liquid, a control device actuated to a first position by the pressure of the liquid when the pump is operative, timing means actuated by the liquid moved by the pump, means controlled by said timing means to discontinue operation of said pump to cause movement of said control device to a second position, and manual means for controlling said pump to position said control device independently of the timing means.

14. A timer, comprising, a casing, a liquid supply in said casing, a chamber in said casing, means for moving liquid from said casing to said chamber, timing means actuated by the liquid level in said chamber, manual means movable from a first position to a second position during a temporary period for actuating said timing means independently of the liquid level in said chamber, and means for returning said manual means from said second position to said first position at the conclusion of said temporary period.

15. In a timer, a casing containing a liquid supply, a first liquid chamber, means for transferring liquid from said casing to said chamber, a control device quickly operable by the flow of liquid, a second liquid chamber positioned beneath said first chamber, means for conducting liquid from said first chamber to said second chamber to fill the latter to a predetermined extent in a predetermined time, means operably responsive to the liquid level in said second chamber for controlling the operation of said first mentioned means, and means for conducting liquid from said second chamber to said casing.

16. A timer comprising a first chamber having an overflow outlet, means for metering liquid from said chamber, means for delivering liquid to said chamber at a rate greater than it can be metered from said chamber, a second chamber for receiving metered liquid from said first chamber, means for metering liquid from said second chamber, a liquid level control associated with said second container for controlling the delivery of liquid to said first chamber, and a dual control operable when liquid is flowing to said first chamber to prevent the metering of liquid from said second chamber and to operate a control device.

17. A timer comprising a first chamber having an overflow outlet, means for metering liquid from said chamber, means for delivering liquid to said chamber at a rate greater than it can be metered from said chamber, a second chamber for receiving metered liquid from said first chamber, means for metering liquid from said second chamber, a liquid level control associated with said second container for controlling the delivery of liquid to said first chamber, and means responsive to the flow of liquid to said first chamber for preventing the metering of liquid from said second chamber and for operating a control device.

18. A timer comprising a chamber, means for metering liquid to said chamber, means for metering liquid from said chamber, means responsive to a liquid level in said chamber for starting and stopping the metering of liquid to said chamber, and a control responsive to the operation of said first metering means for preventing operation of said second metering means and for operating a control device.

19. A timer comprising a chamber, means for metering liquid to said chamber, means for metering liquid from said chamber, means responsive to a liquid level in said chamber for starting and stopping the metering of liquid to said chamber, and a combined valve and switch control responsive to the operation of said first metering means for preventing operation of said second metering means and for operating a control device.

20. A timer comprising a chamber, means for metering liquid to said chamber, means for metering liquid from said chamber, means responsive to a liquid level in said chamber for starting and stopping the metering of liquid to said chamber, alternate means for starting and stopping liquid metering to said chamber, and a control responsive to the operation of said first metering means for preventing operation of said second metering means and for operating a control device.

CLAYTON E. CHARLES.

REFERENCES CITED

The following references are of record in the file of this patent:

UNITED STATES PATENTS

| Number | Name | Date |
|---|---|---|
| 1,345,383 | McKibbin | July 6, 1920 |
| 1,975,423 | Hilken | Oct. 2, 1934 |